United States Patent [19]

Deniger

[11] Patent Number: 5,023,435

[45] Date of Patent: Jun. 11, 1991

[54] RESPONSE FORM PROCESSING SYSTEM

[76] Inventor: David B. Deniger, 4050 Cochran Chapel, Dallas, Dallas County, Tex. 75209

[21] Appl. No.: 489,009

[22] Filed: Mar. 6, 1990

[51] Int. Cl.$^5$ .............................................. G09F 1/08
[52] U.S. Cl. .................................. 235/375; 235/456; 235/462; 283/56; 364/401; 434/363
[58] Field of Search ............... 235/375, 462, 456, 376, 235/383; 379/92; 358/84; 283/56; 364/401, 402; 434/322, 362, 363

[56] References Cited

U.S. PATENT DOCUMENTS

| | | |
|---|---|---|
| 4,345,315 | 8/1982 | Cadotte et al. . |
| 4,424,587 | 1/1984 | Wevelsiep et al. . |
| 4,460,824 | 7/1984 | Kadogaki ............................ 235/375 |
| 4,506,913 | 3/1985 | Kim ....................................... 283/56 |
| 4,514,622 | 4/1985 | Wevelsiep et al. . |
| 4,616,327 | 10/1986 | Rosewarne et al. . |
| 4,654,793 | 3/1987 | Elrod . |
| 4,857,715 | 8/1989 | Koch et al. . |
| 4,877,948 | 10/1989 | Krueger ......................... 235/456 X |

Primary Examiner—Stuart S. Levy
Assistant Examiner—Steven M. duBois
Attorney, Agent, or Firm—Baker & Botts

[57] ABSTRACT

A response form processing system (22) is provided which allows for the processing of response forms (10) which comprise a group code (20), questions (12) and (14), response prompts (16) and response blocks (18). The system (22) comprises a group code reader (24) and a response scanner (28) which are coupled to a processor (26). The processor (26) receives information from the group code reader (24) which identifies which questions are present on a particular response form (10). The processor (26) then receives the scanned responses from the response scanner (28). The processor (26) organizes and tabulates the responses and is capable of producing reports comprising the information received from the response forms (10).

18 Claims, 4 Drawing Sheets

SAMPLE
SEPTEMBER 1989

- HOW WAS YOUR ROOM RESERVATION MADE?

|  | SEPT | % | YTD % |
|---|---|---|---|
| HOTEL RESERVATION DEPT. | 1605 | 29 | 22 |
| TOLL FREE 800 NUMBER | 1232 | 22 | 25 |
| TRAVEL AGENT | 1560 | 28 | 31 |
| GROUP RESERVATION | 1137 | 20 | 18 |
| COMPANY TRAVEL DEPT. | 25 | – | 2 |
| OTHER | 6 | – | 2 |
| TOTAL | 5585 | 100 | 100 |

- WHAT WAS THE PRIMARY PURPOSE OF YOUR STAY?

|  | SEPT | % | YTD % |
|---|---|---|---|
| PLEASURE/HOLIDAY | 1605 | 29 | 22 |
| BUSINESS | 1232 | 22 | 25 |
| CONVENTION/BANQUET | 1560 | 28 | 31 |
| OTHER | 1137 | 20 | 18 |
| TOTAL | 5585 | 100 | 100 |

*FIG. 4*

RESPONSE FORM PROCESSING SYSTEM

TECHNICAL FIELD OF THE INVENTION

This invention relates in general to the field of data processing systems and, more particularly, to a method and system for processing response forms.

BACKGROUND OF THE INVENTION

A common method of receiving feedback from customers of a variety of businesses is through the use of response forms such as comment cards. An owner of a business can use the responses gleaned from his customers to improve services, spot unsatisfactory areas of his products or services or to evaluate marketing techniques and potential. In short, the comments of a customer who has just patronized an establishment are one of the most powerful sources of information to the owner of a business. In the past, the inconvenience to the customer of filling out a response form or using other methods of customer surveys have reduced the effectiveness and accuracy of the comments received. For example, if a response form takes more than just a few seconds for a customer to fill out, chances are that the average customer will not bother to fill out the form unless he is especially dissatisfied with some area of the business. This inconvenience results in inaccurate data compiled from these systems.

Accordingly, a need has arisen for a system for soliciting responses from customers that will encourage the accurate compilation of data from a customer base. A further need has arisen for a system and method of processing the response forms into useful formats such that the data compiled can be used effectively.

SUMMARY OF THE INVENTION

In accordance with the present invention, a response form processing system is provided which substantially eliminates or reduces disadvantages and problems associated with prior art methods and systems of soliciting responses from a customer base. The system of the present invention comprises a group code reader and a response scanner, coupled to a processor system. The system of the present invention is operable to read response forms which comprise both a group code and responses placed on the forms by a customer. The group code comprises information as to a particular group of questions present on a particular response form as well as information as to the client or business associated with the response form.

According to another embodiment of the present invention, a printer may be coupled to the processor to allow for the generation of reports illustrating the compiled and organized data gleaned from a number of response forms. The processor is operable to organize and tabulate the responses read from the response forms according to a variety of parameters, for example, by client, question type or time period for responses.

According to still another embodiment of the present invention, the printer coupled to the processors is operable to print the response forms to include both a group code and appropriate questions and response prompts such that the forms printed are readable by the system of the present invention.

BRIEF DESCRIPTION OF THE DRAWINGS

A more complete understanding of the present invention may be acquired by referring to the detailed description and claims when considered in connection with the accompanying drawings, wherein:

FIG. 4 is an exemplary report produced by the system of the present invention.

DETAILED DESCRIPTION OF THE INVENTION

Figure 1:
FIG. 1 is an illustration of an exemplary response form used in the system of the present invention.

A common failing of the response forms used by businesses is that they take too long for a patron to fill out. Because of the long period of time required, most patrons will not even begin to fill out the response form unless they are especially dissatisfied or especially pleased with some aspect of the business, goods or services. Accordingly, the data gleaned from the response forms tends to be polarized towards the especially dissatisfactory remarks or especially satisfactory remarks, but does not achieve accurate accumulation or tabulation of more benign information such as marketing or demographic data. The response form processing system of the present invention solves this problem by dividing a body of questions into small groups of, for example, two or three questions each. In this manner, a patron of an establishment is only asked to answer a very small number of questions and the time required by the patron is reduced dramatically. If the response forms are presented to the patron at an appropriate time and in a convenient manner, the number of responses received can be dramatically increased as compared to prior systems.

For example, when a patron of a hotel is checking out of the establishment, there is a small delay while the bill of the patron is processed. Although there is variance in the length of this delay, the patron is usually made to wait approximately ten to fifteen seconds for his bill to be processed. During this time, the response form may be presented to the patron. In the ten to fifteen second time period, the patron can only answer a small number of questions. However, statistically speaking, if the questions are dispersed throughout the response forms in an appropriate manner, an accurate compilation of data can be achieved. In other words, it is statistically equivalent to ask each of a small number of patrons to answer all of the questions and to ask only a small number of questions to a large number of patrons. However, the division of a body of questions among a plurality of different response forms makes the processing of the data received from the response forms slightly more difficult. These difficulties are solved by the system and method of the present invention.

The response form processing system of the present invention is equally applicable where a response group asked to fill out the response forms constitutes a defined group, for example, in polling a known client base. The convenience of providing only a small number of questions to each client within a set client base, mailing list, group of employees or other defined group will still provide for a more accurate and complete data compilation. The difficulties attendant with the compilation of data using the method of dividing a body of questions into small groups are solved by the system of the present invention for defined groups as with random samplings. Accordingly, the system of the present invention is ideally suited for conducting client surveys, employee surveys or other samplings involving a defined target group. Accordingly, while the term "patron" will be used to describe the system of the present invention, this term should be construed broadly to include anyone asked to complete a response form.

Referring to FIG. 1, an exemplary response form indicated generally at 10, which might be used in conjunction with the system of the present invention, is illustrated. Response form 10 comprises two questions indicated generally at 12 and 14. Question 12 asks the patron "How was your room reservation made?". Following question 12 are six response prompts, indicated generally at 16, each having a response block 18 associated with them. Similarly, question 14 inquires of the patron, "What was the primary purpose of your visit?", and has three response prompts 16 with three corresponding response blocks 18.

The patron is instructed to mark the response blocks 18 with an "X" to indicate his opinion. Because of the small number of questions and the convenient presentation of the response prompts 16, a patron could complete response form 10 in a matter of seconds. Other response forms similar to form 10 may ask a patron a similarly small number of questions which can also be conveniently answered in a matter of seconds. Accordingly, a large number of questions can be divided into short, convenient response forms such as form 10. It is this convenience that results in a large number of accurate responses and a correspondingly accurate and valuable compilation of data.

The final component of response form 10 comprises a group code 20. Group code 20 provides for the organization of the body of questions subdivided into the various response forms. Group code 20 may comprise, for example, a machine-readable bar code. Group code 20 contains information as to which of the questions are present on this particular response form 10. Further, group code 20 may comprise information as to which client or business these questions apply to. For example, a single response form processing system could be used to process response forms from many different companies, businesses, or divisions within a single business. If group code 20 comprises client identification information, a large number of response forms could be processed by the response form processing system of the present invention without having to subdivide the response forms prior to processing.

Figure 2:
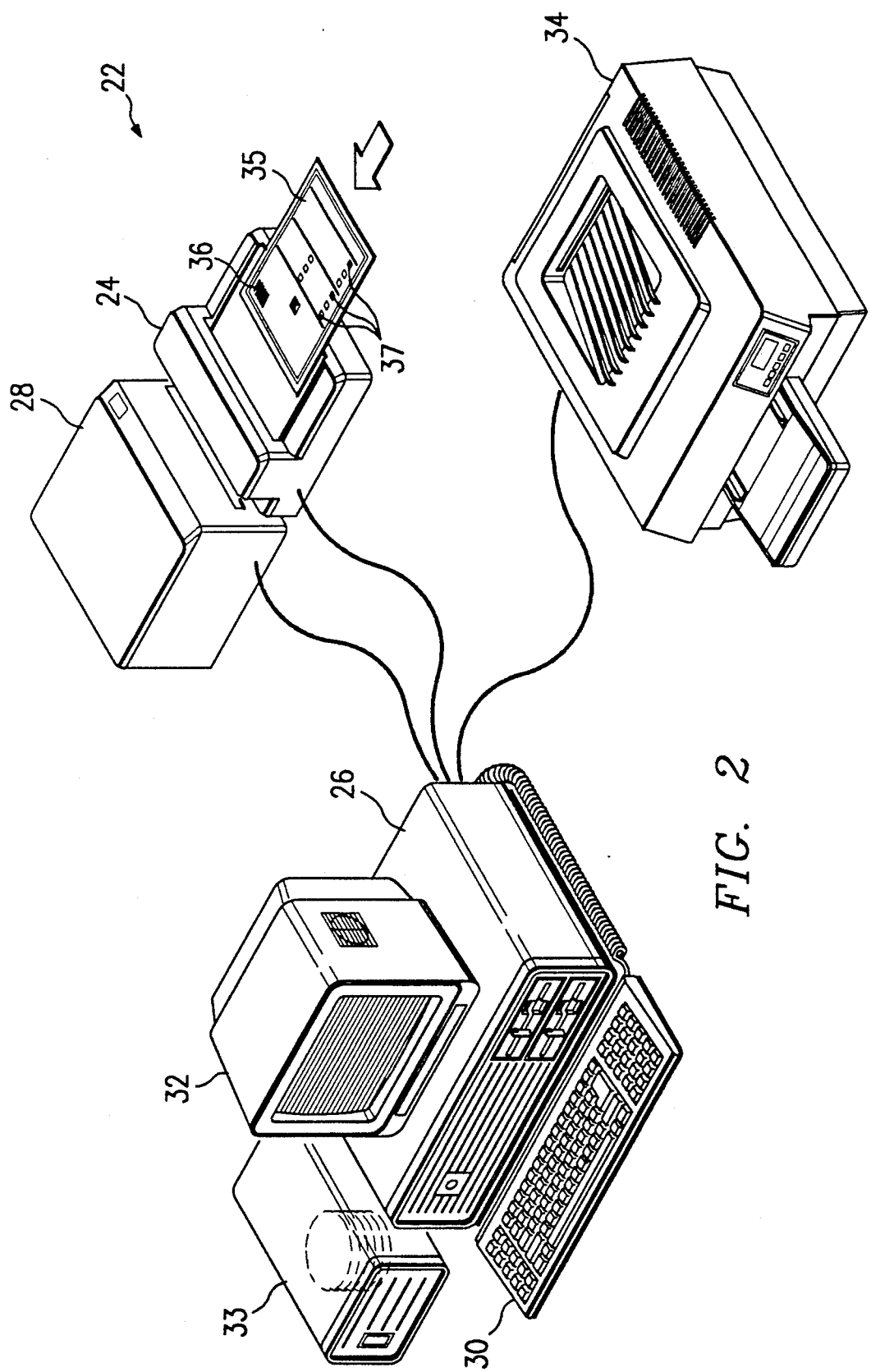
FIG. 2 is a diagram illustrating the response form processing system of the present invention.

Referring to FIG. 2, a response form processing system, indicated generally at 22, constructed according to the teachings of the present invention is illustrated. System 22 comprises a group code reader 24 which is coupled to a processor 26. Also coupled to processor 26 is a response scanner 28. A keyboard 30 and a monitor 32 are also shown coupled to processor 26. Processor 26 may also be coupled to a storage system 33 which may comprise, for example, a hard disk memory system or an optical disk storage system. Additionally, processor 26 may be coupled to a printer 34. System 22 is shown in FIG. 2 processing an exemplary response form 35 which comprises, as described previously, a group code 36. Also shown on exemplary response form 35 are a plurality of handwritten responses 37, which have been placed on exemplary response form 35 by a patron in the appropriate response blocks [not shown].

More specifically, group code reader 24 may comprise a bar code reader such as, for example, a Model LL-200-100-A bar code generator and reader manufactured by Symbol Technology, Inc. Response scanner 28 may comprise, for example, a Scantron 8000 optical scanner manufactured by Scantron, Inc. Processor 26 may comprise, for example, an IBM compatible 386 class personal computer having a suitable keyboard 30 and monitor 32 to allow for control of system 22 by a user of the system. Printer 34 may comprise, for example, a suitable laser printer. System 22 operates using a data base-type program running in processor 26 such as Foxbase version 2.1. Additionally, an overlay program such as Powertext Formatter version 3.0 is run concurrently to manage the transfer of data between processor 26 and group code reader 24, response scanner 28, storage system 33 and printer 34.

Figure 3:
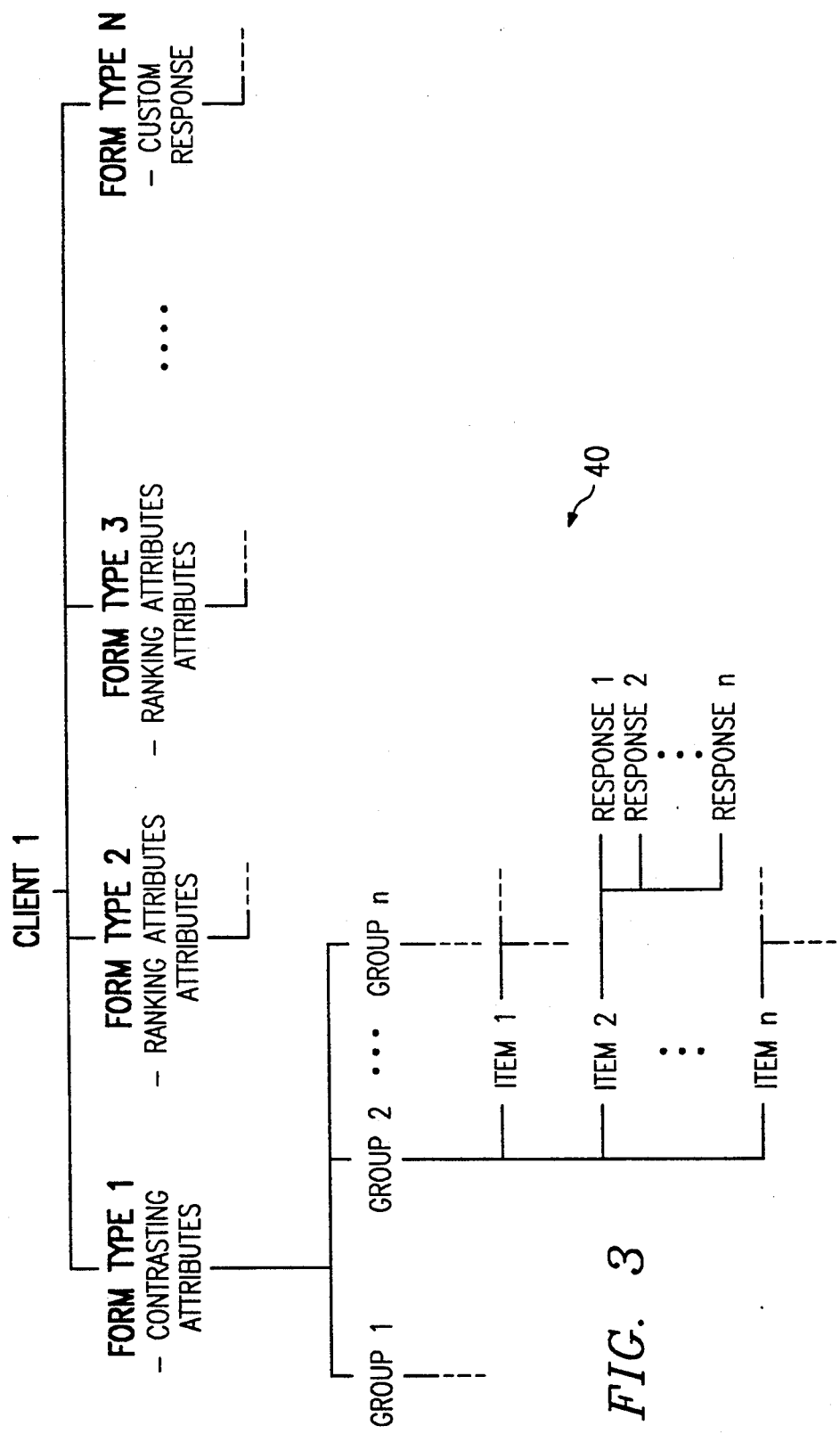
FIG. 3 is a diagram illustrating the organization of the data base files used in conjunction with the system of the present invention.

To initialize system 22, a data base structure may be established to allow for the organization and tabulation of the data received from the response form 10 as they are read by group code reader 24 and response scanner 28. FIG. 3 is a diagram which illustrates one possible method of organizing the data base files used to compile the data from response forms 10 as they are read by system 20. FIG. 3 illustrates an organizational tree, indicated generally at 40, which shows the descending levels of organization of the data base files used by system 22. The first level of organization is the client level. Each client, business or division within a single business handled by system 22 may have a data base structure such as is illustrated by diagram 40. The term "client" will be used herein in a broad sense to mean a single client, a business, or any division of a business which it might be convenient to assign a separate body of questions and corresponding response data base structure. Using a relational data base program, such as Foxbase 2.1 mentioned previously, a CLIENT data base file may be created having records comprising a client number and a client name field for each client using system 22. Each client may have a variety of form types which comprise the next level of diagram 40. For example, the response form 10 shown in FIG. 1 would be an example of a contrasting attribute form type, which is shown as form type 1 in diagram 40. Many other form types are possible such as, for example, ranking attributes or custom responses. A ranking attribute response form might give a specific example of a service, for example, and ask the patron to rate the service on a predetermined scale, for example, excellent to poor using various gradations therebetween. The third type of form is labelled as custom responses in diagram 40 and may comprise, for example, asking for free form responses from patrons. Free form responses would require entry of the responses by hand into system 22. A form type N is shown in organizational diagram 40 to illustrate that a variety of other form types are possible and that the types of forms specifically described in organizational diagram 40 should not be construed to represent an exhaustive list of form types.

Within each type of form, the body of questions that the client wishes to pose to his patrons can be divided into groups, each having a small number of items corresponding to the questions being asked of the patron on a single response form. For each item, there may be any number of response prompts.

The components of organizational tree diagram 40 may be organized in a data base structure using four separate data base files. A CLIENT data base file discussed previously may comprise a client number and a client name. The CLIENT data base file can be linked to a GROUP data base file which may comprise a client number, a form type number, a group number and a description of the group. The GROUP data base file can be linked to an ITEM data base file which may comprise a group number, an item number and a description of the item. The ITEM data base file can then be linked to a RESPONSE data base file which may comprise an item number, the response numbers, and a description of the response prompts.

Using this data base structure, the response forms 10 may be printed using printer 34. The item descriptions may be taken from the ITEM data base file and the response prompts may be taken from the RESPONSE data base file for each different response form. The group code 20 may be encoded and printed to contain the client number, the type number and the group number, all of which may be taken from the GROUP data base file for each response form.

During the operation of system 22, the information in each group code is read from the response forms by group code reader 24 and is input into processor 26 into the appropriate data base file. As discussed previously, each group code may comprise a machine readable bar code and group code reader 24 may comprise an optical bar code reader system. According to this embodiment, response form 10 need not be actually fed into group code reader 24. A variety of bar code reading systems such as the Symbol Technology Model LL-200-100-A mentioned previously can accurately read bar codes from a distance. Hence, during the feeding of the response forms 10 into response scanner 28, each of the response forms need only be sequentially brought proximate group code reader 24 to provide for the sequential accurate reading of each group code.

As the sequential scanning of the response forms proceeds, the information from each response form may be read into a SCANNER data base file. The SCANNER data base file may contain a client number, a type number, a group number and item numbers received from the group code 20 read from the response form as discussed previously. A date field may be entered using keyboard 30. This date field may comprise, for example, a month associated with all of the response forms being entered at one time. The SCANNER data base file may further comprise a plurality of item scan fields which comprise binary data from response scanner 28. For example, each bit in the binary word received from response scanner 28 may correspond to either a positive or negative response for each response prompt read for each item on a particular response form.

The SCANNER data base file may be processed into a FIELD data base file. The FIELD data base file may comprise a client number, type number, group number, item number, response number, and date total fields corresponding to the date field in the SCANNER data base file. For example, if the totals for each response for each month were desired, the operator could enter the particular month in the SCANNER data base file and the FIELD data base file would be structured to have monthly total fields for January through December. The processing of the SCANNER data base file could then tabulate the responses for each item according to the months in which those responses were received from patrons of the client. It should be noted that if only a monthly total, for example, is required, the SCANNER data base may be eliminated and the totals for each month may be directly gleaned from the response forms.

The data accumulated and tabulated in the FIELD data base file may be output in a variety of methods using the report generation capabilities of the data base program used or using other known data presentation systems. FIG. 4 is an exemplary report which might be associated with the response forms shown in FIG. 1 for the month of Sept., 1989. The monthly totals for each response are shown next to the associated response prompt. Further, the total responses are shown for that month. Using the mathematics capability of the data base program, the percentage of each response to the total is also calculated and shown. Further, a year-to-date percentage may be calculated and included in the report by comparing the monthly totals to the combined totals of all the responses to date. It should be understood that the report shown in FIG. 4 is presented solely for the purposes of teaching the present invention and should not be construed to limit the scope of the present invention to this or any other format of reporting the data accumulated using system 22. The format of the report may be varied greatly depending upon the format in which the questions are posed to the patron and the particular wishes of a client as to the presentation of the data. In summary, the scope of the present invention should be construed to include the complete flexibility inherent in known data base operation and presentation techniques.

It should be understood that suitable handshaking signals and other known data processing techniques are used during the reading of response forms 10 to allow for the appropriate distribution of the data read from group code 20 in responses 37 into the appropriate data base files within processor 26. It should be further understood that storage of the data values may occur at any time during the processing system within a storage system such as storage system 33. These handshaking and data management functions may be accomplished using the Powertext Formatter program described previously or using other known methods. Further, after the initialization of the data base files, the actual printing of the response forms 10 may be accomplished by a mass printing system not associated with processor 26. The totality of system 22 is presented in FIG. 2 for the purposes of teaching the present invention and any subdivision of this system is intended to be included within the scope of the present invention.

In summary, a response form processing system is provided which allows for the processing of response forms which each contain a separate group of questions from a body of questions associated with a particular client. The subdivision of the questions onto convenient response forms make it easier for a patron of a particular business to complete the response form. The various responses may then be compiled and tabulated using a data base program. The data values may then be reported in a variety of methods. The subdivision of the questions into smaller groups provides for a greater response rate from patrons and thus a more valuable marketing and quality control tool to the owner of a business. The response form processing system comprises a group code reader and a response scanner both coupled to a processing system. The group codes read by the group code reader provide information which allows for the identification of which questions are present on a particular response form.

Although the present invention has been described in detail, it should be understood that various changes, substitutions and alterations can be made hereto without departing from the spirit and scope of the invention as defined by the appended claims.

What is claimed is:

1. A system for processing response forms, comprising:
    storage circuitry means for storing a group of questions associated with a client, a group code disposed on a particular response form comprising information identifying said particular response form with said client;
    circuitry means for selecting a particular plurality of questions from said group of questions for inclusion on said particular response form, said group code further comprising information indicating which questions of said group comprise said particular plurality;
    a group code reader for reading said group code from said particular response form;
    a response scanner for reading responses associated with said particular plurality of questions from said particular response form; and
    a processor means coupled to said group code reader, said response scanner and said storage circuitry means and operable to tabulate the responses responsive to the values of said group code and said responses.

2. The system of claim 1 wherein the group codes comprise bar codes and wherein said group code reader comprises a bar code reader.

3. The system of claim 1 and further comprising:
    a printer for printing the response forms, the response forms each comprising a selected group code, a particular group of questions associated said selected group code and a particular group of response prompts associated with each question.

4. The system of claim 1 wherein said processor is further operable to output selected ones of said tabulated responses in a report, the system further comprising:
    selection circuitry means coupled to said processor operable to receive input from a user such that the user may select said ones of said tabulated responses for a particular report.

5. The system of claim 4 and further comprising a printer coupled to said processor and operable to print said reports.

6. The system of claim 1 wherein said storage circuitry means is further operable to store said tabulated responses.

7. The system of claim 1 wherein the responses comprise handwritten marks at predetermined locations on the response forms and wherein said response scanner comprises an optical scanner operable to read said handwritten marks.

8. The system of claim 1 wherein the response forms comprise comment cards for soliciting comments from patrons of said client.

9. The system of claim 1 wherein said processor means comprises a personal computer.

10. A system for processing responses recorded on response forms, comprising:
    storage circuitry means for storing a group of questions associated with a client, a group code associated with a particular response form comprising information identifying said particular response form with said client;
    circuitry means for selecting a particular plurality of questions from said group of questions for inclusion on said particular response form, said group code further comprising information indicating which questions of said group comprise said particular plurality;
    a group code reader for reading said group code from said particular response form;
    an optical scanner for reading responses from said particular response form;
    a processor means coupled to said group code reader and said optical scanner and operable to tabulate the responses responsive to the values of said group code and the responses, said processor further operable to output selected ones of said tabulated responses in a report;
    a printer for printing said particular response form, said particular response form comprising said group code, said particular plurality of questions associated said group code and a particular group of response prompts associated with each question of said particular plurality;
    selection circuitry means coupled to said processor operable to receive input from a user such that the user may select particular ones of said tabulated responses for a particular report, said printer further operable to print said reports; and
    said storage circuitry means coupled to said processor and further operable to store said tabulated responses.

11. The system of claim 10 wherein the responses comprise handwritten marks at predetermined locations on the response forms and wherein said optical scanner is operable to read said handwritten marks.

12. The system of claim 10 wherein said processor means comprises a personal computer.

13. A method for processing response forms, comprising the steps of:
    selecting a plurality of questions from a group of questions;
    assigning the selected plurality a particular group code;
    printing a response form having the particular group code, the selected plurality of questions and response prompts associated with each of the selected plurality of questions;
    reading the group code from the response form using a group code reader, the group codes indicating the presence of the selected plurality of questions on the response form;
    reading responses from the response form using a response scanner; and
    tabulating the responses using a processor coupled to the group code reader and the response scanner.

14. The method of claim 13 and further comprising the step of storing the tabulated responses in a storage system coupled to the processor.

15. The method of claim 13 and further comprising the steps of:
    organizing selected ones of the tabulated responses in a report; and
    printing the report.

16. The method of claim 13 wherein said step of reading responses comprises the step of reading handwritten marks from predetermined locations on the response forms using an optical scanner.

17. The method of claim 13 wherein said step of reading a group code comprises the step of reading a bar code using a bar code reader.

18. The method of claim 13 wherein said step of reading a group code comprises the step of reading a group code comprising information indicative of a client associated with a particular response form and information indicative of a particular group of questions present on the particular response form.

* * * * *